(12) United States Patent
Maxwell

(10) Patent No.: US 12,054,276 B2
(45) Date of Patent: Aug. 6, 2024

(54) INSTALLATION OF GEAR ASSEMBLIES IN AIRCRAFT GEARBOXES

(71) Applicant: Textron Innovations Inc., Providence, RI (US)

(72) Inventor: John Nathan Maxwell, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/746,786

(22) Filed: May 17, 2022

(65) Prior Publication Data

US 2023/0373646 A1 Nov. 23, 2023

(51) Int. Cl.
*B23P 15/00* (2006.01)
*B64D 35/00* (2006.01)

(52) U.S. Cl.
CPC ............ *B64D 35/00* (2013.01); *B23P 15/003* (2013.01); *B23P 2700/01* (2013.01); *F05D 2220/90* (2013.01); *Y10T 29/49696* (2015.01)

(58) Field of Classification Search
CPC ........ B23P 15/003; F16C 43/04; F16C 43/06; F16H 57/023
See application file for complete search history.

(56) References Cited

U.S. PATENT DOCUMENTS 6,264,138 B1 * 7/2001 Hawkins ................ B64D 35/08
244/65
2018/0087656 A1 * 3/2018 Poster ................. F16H 57/0449

FOREIGN PATENT DOCUMENTS

JP 201653422 A * 4/2016 .............. F16C 43/06

OTHER PUBLICATIONS

Machine translation of JP-201653422-A (Year: 2016).*

* cited by examiner

*Primary Examiner* — Kyle A Cook
(74) *Attorney, Agent, or Firm* — Lawrence Youst PLLC

(57) ABSTRACT

A method of assembling an aircraft gearbox. The method includes mounting an outer race and a plurality of rollers of a roller bearing in an opening of a gearbox housing, mating a cylindrical guide sleeve having a lead-in chamfer with a gear assembly having a gear and a cylindrical shaft such that a trailing shoulder of the guide sleeve is positioned proximate a leading shoulder of the shaft, the shaft including an inner race of the roller bearing, axially passing the lead-in chamfer of the guide sleeve through the plurality of rollers, radially outwardly urging the rollers toward the outer race with the guide sleeve, axially passing the leading shoulder of the shaft through the plurality of rollers, positioning the inner race relative to the plurality of rollers to form the roller bearing and removing the guide sleeve from the gear assembly.

20 Claims, 11 Drawing Sheets

INSTALLATION OF GEAR ASSEMBLIES IN AIRCRAFT GEARBOXES

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to assembling aircraft gearboxes and, in particular, to the use of removeable guide sleeves having lead-in chamfers that temporarily couple to gear assemblies to protect the rollers of gearbox roller bearings during the installation of the gear assemblies in aircraft gearboxes.

BACKGROUND

Rotary-wing aircraft generate lift by rotating a rotor assembly coupled to a mast. Such rotary-wing aircraft are normally capable of vertical takeoff and landing and may accordingly be referred to as VTOL aircraft. Examples of rotary-wing aircraft include helicopters and tiltrotor aircraft. In addition to vertical takeoff and landing, rotary-wing aircraft are commonly capable of forward, backward, lateral and hovering flight. These attributes make rotary-wing aircraft highly versatile for use in congested, isolated or remote areas.

Rotary-wing aircraft typically generate torque and rotational energy for the rotor assembly using one or more internal combustion engines. A drive system, positioned between the engine and the mast, generally includes one or more aircraft gearboxes that may serve a variety of functions. For example, certain aircraft gearboxes provide gear reduction such that both the engine and the rotor assembly may operate at optimum rotational speeds. In addition, aircraft gearboxes may enable changing the torque direction between the engine to the mast, combining input torque from multiple engines and/or splitting output torque to multiple power consumers such as a main rotor and a tail rotor or two proprotors.

In some aircraft gearboxes, the gear assemblies are supported by roller bearings that enable rotation of the gear assemblies relative to the gearbox housing. It has been found, however, that certain rollers within such roller bearings tend to drop slightly out of position due to gravity (see FIG. 1) such that during installation of a gear assembly into a roller bearing mounted in the gearbox housing (see progression of FIGS. 2A-2C), a leading shoulder of the gear shaft may impact one or more of the rollers (see FIGS. 1 and 2B). This impact may damage the affected rollers leading to scrapping of the roller bearing or premature failure of the roller bearing.

SUMMARY

In a first aspect, the present disclosure is directed to a method of assembling an aircraft gearbox that includes mounting an outer race and a plurality of rollers of a roller bearing in an opening of a gearbox housing; mating a cylindrical guide sleeve having a lead-in chamfer with a gear assembly having a gear and a cylindrical shaft such that a trailing shoulder of the guide sleeve is positioned proximate a leading shoulder of the shaft, the shaft including an inner race of the roller bearing; axially passing the lead-in chamfer of the guide sleeve through the plurality of rollers; radially outwardly urging the rollers toward the outer race with the guide sleeve; axially passing the leading shoulder of the shaft through the plurality of rollers; positioning the inner race relative to the plurality of rollers to form the roller bearing; and removing the guide sleeve from the gear assembly.

The method may also include inserting a leading end of the shaft within a trailing end of the cylindrical guide sleeve; inserting a trailing end of the cylindrical guide sleeve within a leading end of the shaft; mating a polymeric guide sleeve with a metallic gear assembly; mating a cylindrical guide sleeve having a lead-in chamfer angle of less than twenty degrees with the gear assembly; mating a cylindrical guide sleeve having a lead-in chamfer angle of between five degrees and twenty degrees with the gear assembly; mating a cylindrical guide sleeve having a lead-in chamfer angle of between five degrees and ten degrees with the gear assembly; inserting a leading end of the lead-in chamfer into the plurality of rollers before mating the cylindrical guide sleeve with the gear assembly; inserting a leading end of the lead-in chamfer into the plurality of rollers after mating the cylindrical guide sleeve with the gear assembly and/or axially passing the lead-in chamfer of the guide sleeve through the plurality of rollers and radially outwardly urging the rollers toward the outer race with the guide sleeve simultaneously.

In a second aspect, the present disclosure is directed to a method of assembling an aircraft gearbox that includes mounting a first outer race and a first plurality of rollers of a first roller bearing in a first opening of a gearbox housing and mounting a second outer race and a second plurality of rollers of a second roller bearing in a second opening of the gearbox housing; mating a first cylindrical guide sleeve having a first lead-in chamfer with a first gear assembly having a first gear and a first cylindrical shaft such that a trailing shoulder of the first guide sleeve is positioned proximate a leading shoulder of the first shaft, the first shaft including a first inner race of the first roller bearing; mating a second cylindrical guide sleeve having a second lead-in chamfer with a second gear assembly having a second gear and a second cylindrical shaft such that a trailing shoulder of the second guide sleeve is positioned proximate a leading shoulder of the second shaft, the second shaft including a second inner race of the second roller bearing; forming a gear system by meshing the first gear and the second gear; axially passing the first lead-in chamfer through the first plurality of rollers and axially passing the second lead-in chamfer through the second plurality of rollers; radially outwardly urging the rollers toward the outer races with the guide sleeves; axially passing the leading shoulder of the first shaft through the first plurality of rollers and axially passing the leading shoulder of the second shaft through the second plurality of rollers; positioning the first inner race relative to the first plurality of rollers to form the first roller bearing and positioning the second inner race relative to the second plurality of rollers to form the second roller bearing; and removing the first and second guide sleeves from the first and second gear assemblies.

In a third aspect, the present disclosure is directed to a method of assembling an aircraft gearbox that includes mounting a first outer race and a first plurality of rollers of a first roller bearing in an opening of a first gearbox housing member and mounting a second outer race and a second plurality of rollers of a second roller bearing in an opening of a second gearbox housing member; mating a cylindrical guide sleeve having a lead-in chamfer with a gear assembly having a gear, a first cylindrical shaft and a second cylindrical shaft that is oppositely disposed relative to the first cylindrical shaft such that a trailing shoulder of the guide sleeve is positioned proximate a leading shoulder of the first shaft, the first shaft including a first inner race of the first roller bearing, the second shaft including a second inner race of the second roller bearing; axially passing the lead-in chamfer of the guide sleeve through the first plurality of rollers; radially outwardly urging the rollers of the first plurality of rollers toward the first outer race with the guide sleeve; axially passing the leading shoulder of the first shaft through the first plurality of rollers; positioning the first inner race relative to the first plurality of rollers to form the first roller bearing; removing the guide sleeve from the gear assembly; mating the cylindrical guide sleeve with the gear assembly such that the trailing shoulder of the guide sleeve is positioned proximate a leading shoulder of the second shaft; axially passing the lead-in chamfer of the guide sleeve through the second plurality of rollers; radially outwardly urging the rollers of the second plurality of rollers toward the second outer race with the guide sleeve; axially passing the leading shoulder of the second shaft through the second plurality of rollers; positioning the second inner race relative to the second plurality of rollers to form the second roller bearing; and removing the guide sleeve from the gear assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1:
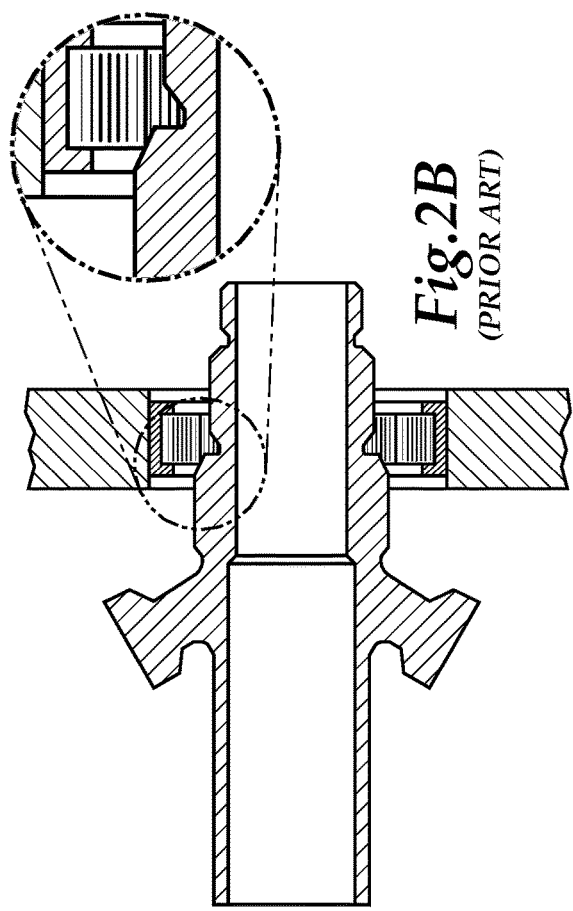
FIG. 1 is a schematic illustration of a roller bearing demonstrating roller drop.
Figure 2B:
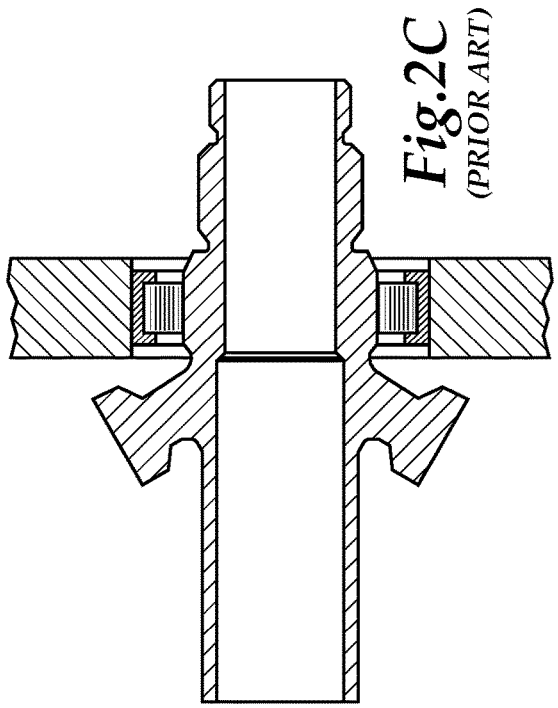
FIGS. 2A-2C are prior art illustrations depicting a leading shoulder of a gear assembly impacting a roller of a roller bearing during the installation of a gear assembly into a roller bearing mounted in an aircraft gearbox housing.
Figure 2A:
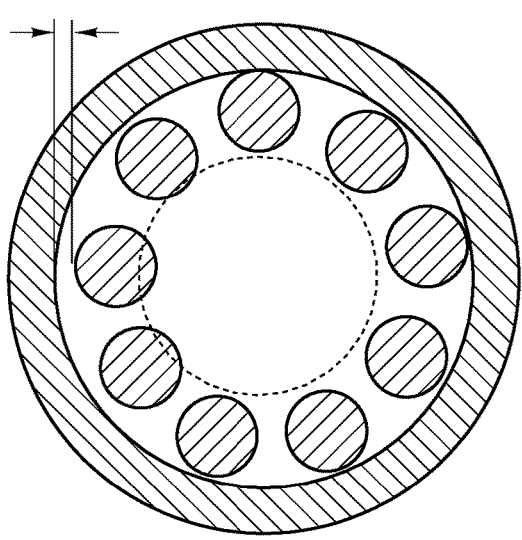
Figure 2C:
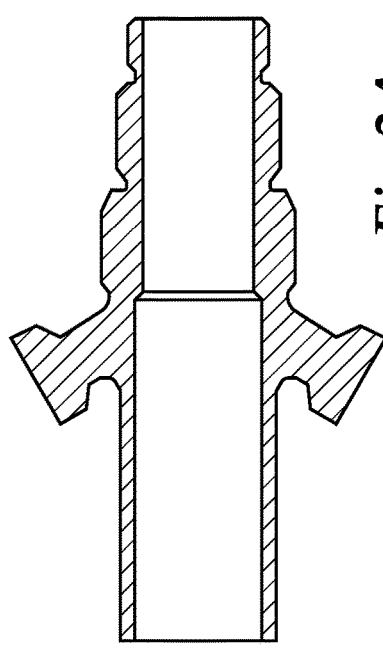
Figure 3B:
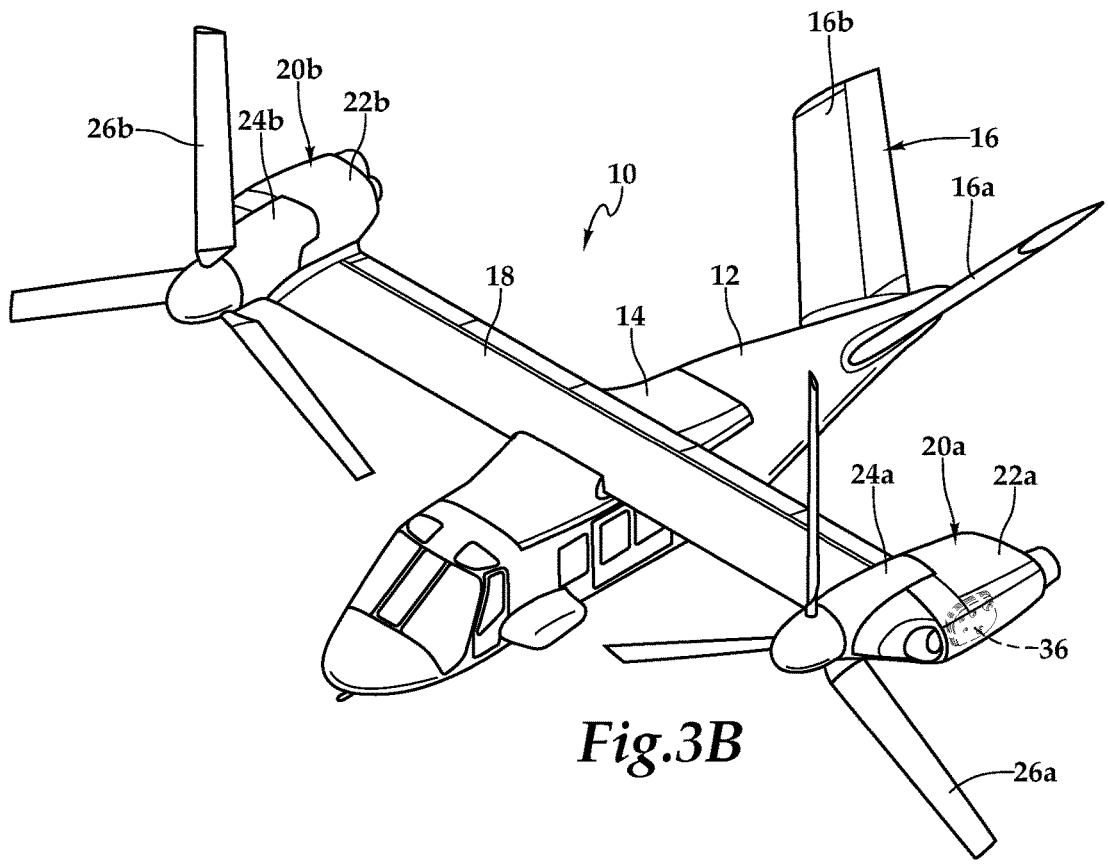
FIGS. 3A-3B are schematic illustrations of a tiltrotor aircraft including an aircraft gearbox assembled in accordance with embodiments of the present disclosure.
Figure 3A:
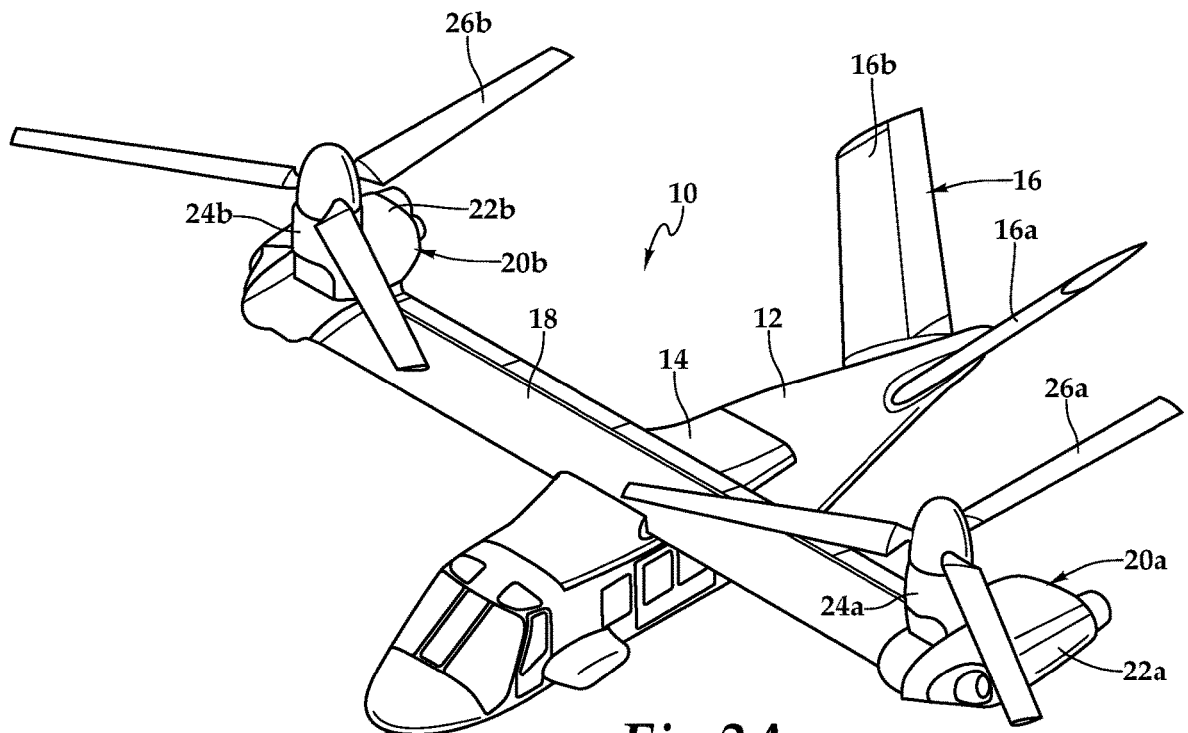

Referring now to FIGS. 3A-3B in the drawings, a tiltrotor aircraft including an aircraft gearbox assembled in accordance with methods as described herein is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system including a fixed gearbox 36 assembled in accordance with methods described herein. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally vertical orientation, as best seen in FIG. 3A, a generally horizontal orientation, as best seen in FIG. 3B. Pylon assembly 24a includes a tiltable portion of the drive system and a proprotor assembly 26a that is rotatable responsive to torque and rotational energy provided via the engine and drive system. Likewise, propulsion assembly 20b includes a fixed nacelle 22b that houses an engine and a fixed portion of the drive system including a fixed gearbox (not visible) assembled in accordance with methods described herein. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally vertical orientation, as best seen in FIG. 3A, a generally horizontal orientation, as best seen in FIG. 3B. Pylon assembly 24b includes a tiltable portion of the drive system and a proprotor assembly 26b that is rotatable responsive to torque and rotational energy provided via the engine and drive system.

FIG. 3A illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. FIG. 3B illustrates aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. It should be appreciated that aircraft 10 can be operated such that proprotor assemblies 26a, 26b are selectively positioned between airplane mode and helicopter mode, which can be referred to as a conversion flight mode.

Figure 4A:
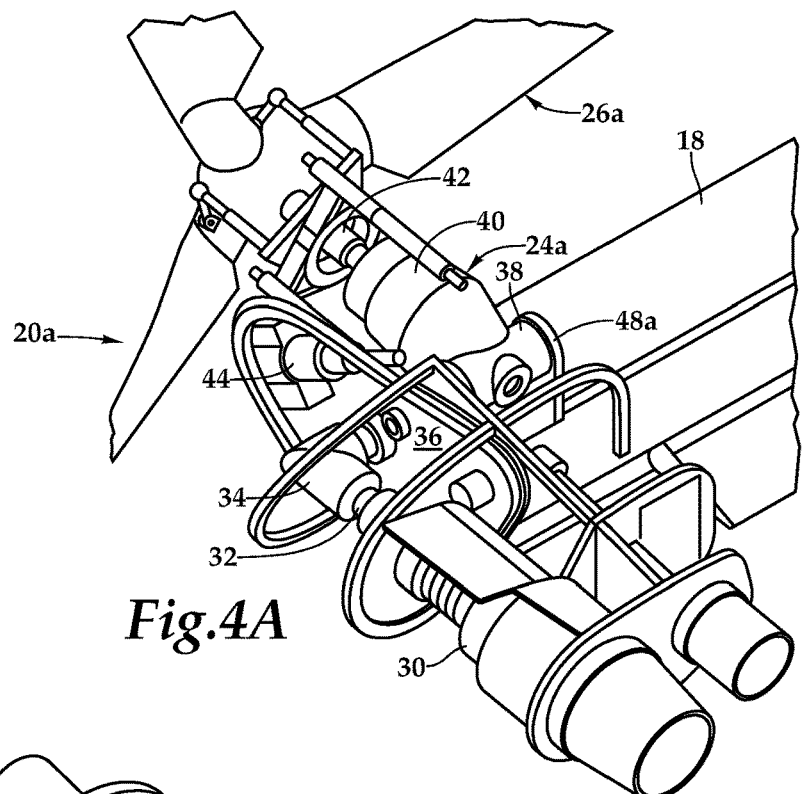
FIGS. 4A-4B are schematic illustrations of a propulsion assembly for a tiltrotor aircraft including an aircraft gearbox assembled in accordance with embodiments of the present disclosure.
Figure 4B:
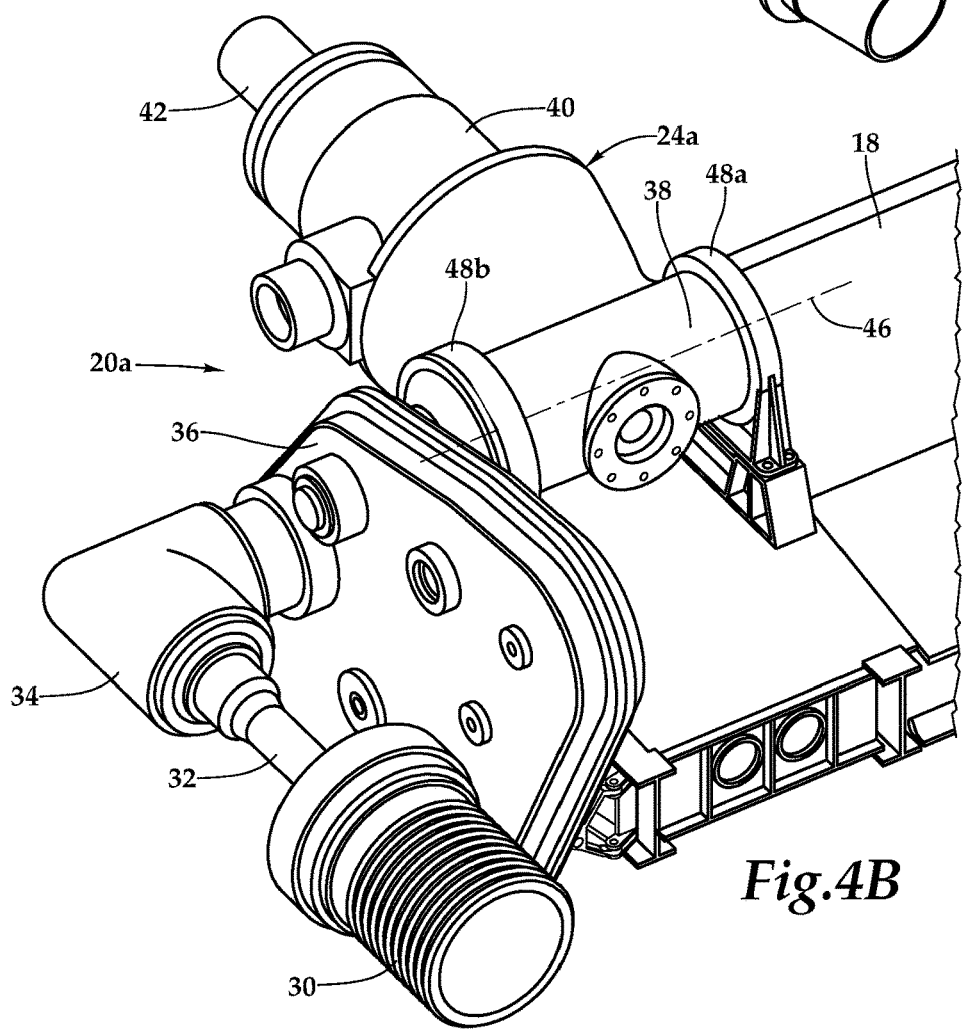

Referring additionally to FIGS. 4A-4B in the drawings, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 30 that is fixed relative to wing 18. An engine output shaft 32 transfers torque from engine 30 to a spiral bevel gearbox 34 that includes spiral bevel gears to change torque direction by approximately 90 degrees from engine 30 to a fixed gearbox 36. An output shaft of fixed gearbox 36 transfers torque to an input gear of a spindle gearbox 38 which forms a first portion of a proprotor gearbox 40. A mast 42 of proprotor gearbox 40 transfers torque to proprotor assembly 26a. A conversion actuator 44 can be actuated so as to selectively rotate proprotor gearbox 40 and thus pylon assembly 24a about a conversion axis 46, which in turn selectively positions proprotor assembly 26a between helicopter mode, as best seen in FIG. 3A, and airplane mode, as best seen in FIG. 3B. The operational loads, such as thrust loads, are transmitted through mast 42 and into spindle gearbox 38 of proprotor gearbox 40 and thus the structural support of spindle gearbox 38 is critical. In the illustrated embodiment, spindle gearbox 38 is rotatably coupled to the airframe of tiltrotor aircraft 10 by mounting spindle gearbox 38 to an inboard bearing assembly 48a and an outboard bearing assembly 48b. Thus, spindle gearbox 38 is structurally supported and is operable to be rotated about conversion axis 46 by conversion actuator 44.

Figure 5A:
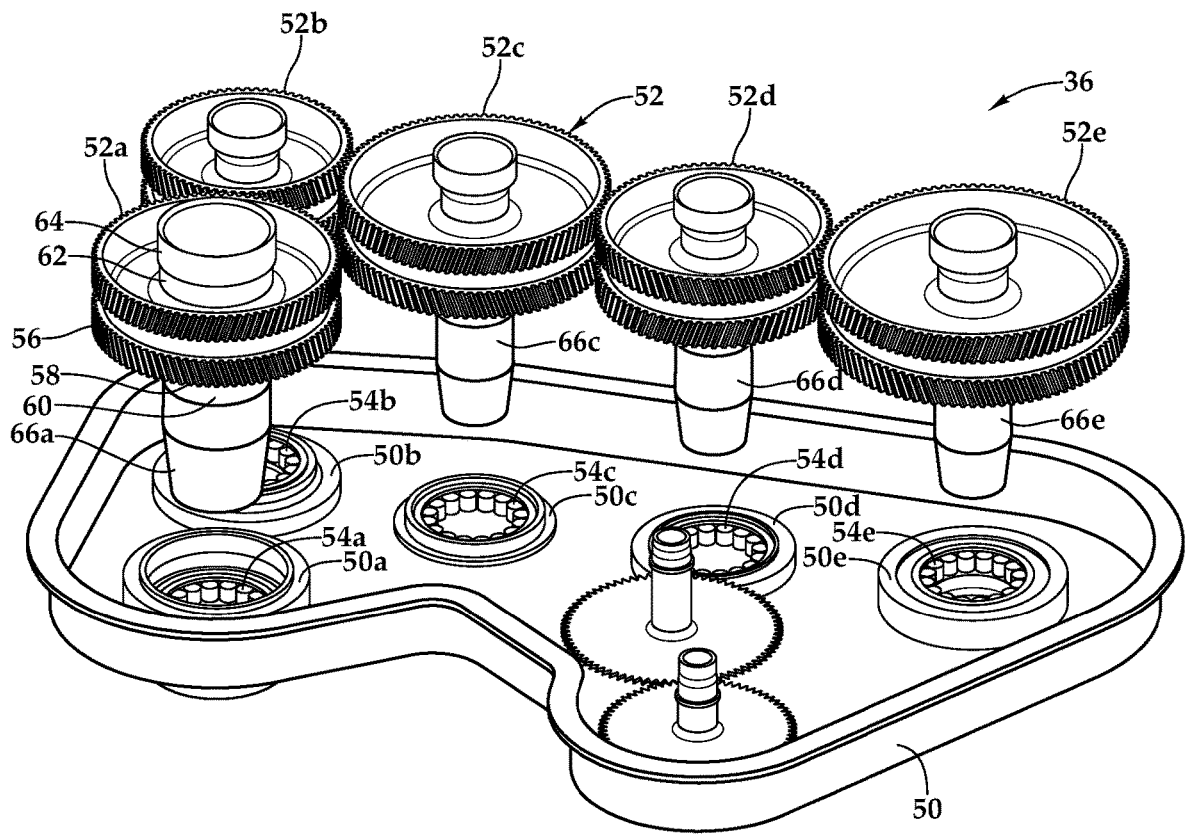
FIGS. 5A-5B are exploded and partially assembled views of an aircraft gearbox in accordance with embodiments of the present disclosure.
Figure 5B:
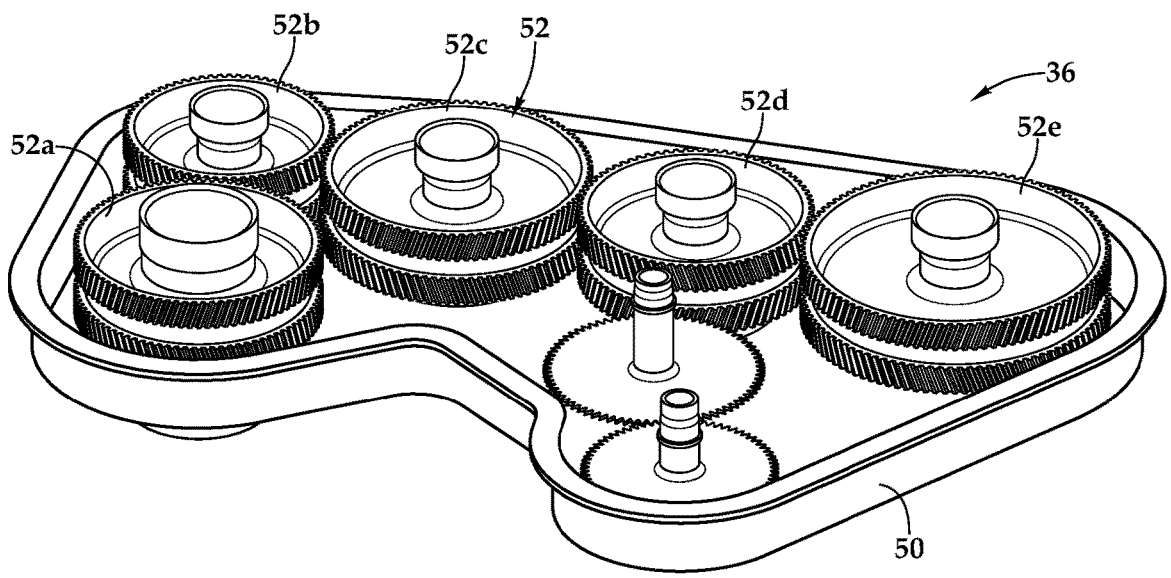

Referring additionally to FIGS. 5A-5B in the drawings, fixed gearbox 36 is disclosed in further detail. FIG. 5A depicts fixed gearbox 36 with one half of a clam shell gearbox housing 50 removed for clarity and with gear system 52 disposed relative to gearbox housing 50 prior to installation. In the illustrated embodiment, gearbox housing 50 includes five openings 50a, 50b, 50c, 50d, 50e that each have mounted therein an outer race and a plurality of rollers of a roller bearing 54a, 54b, 54c, 54d, 54e. Gear system 52 includes five gear assemblies 52a, 52b, 52c, 52d, 52e each having a double-helical gear and oppositely disposed cylindrical shafts including an inner race for a roller bearing. For example, gear assembly 52a includes double-helical gear 56, cylindrical shaft 58 with an inner race 60 and cylindrical shaft 62 with an inner race 64. A cylindrical guide sleeve has been coupled to the downwardly extending cylindrical shafts of each gear assembly 52a, 52b, 52c, 52d, 52e with only cylindrical guide sleeves 66a, 66c, 66d, 66e being visible. As discussed herein, each cylindrical guide sleeve has a lead-in chamfer with a progressively increasing outer diameter from the distal end toward the proximal end. This configuration enables the lead-in chamfer to enter the plurality of rollers of a respective roller bearing without contacting a side surface of any of the rollers. Thereafter, as the lead-in chamfer axially passes through the plurality of rollers, the rollers are radially outwardly urged toward the outer race such that a leading shoulder of a cylindrical shaft of a gear assembly can pass through the plurality of rollers without contacting a side surface of any of the rollers. FIG. 5B illustrates gear system 52 installed within gearbox housing 50 and specifically with gear assemblies 52a, 52b, 52c, 52d, 52e installed within roller bearing 54a, 54b, 54c, 54d, 54e and with each of the cylindrical guide sleeves removed from the respective gear assembly 52a, 52b, 52c, 52d, 52e.

Figure 6A:
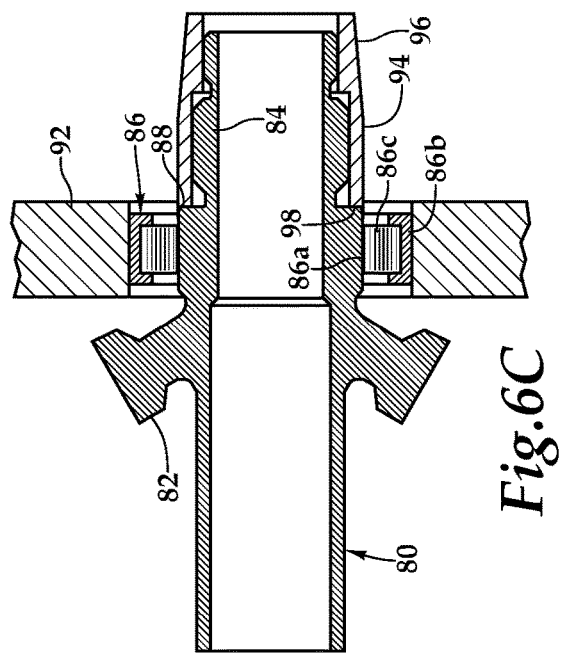
FIGS. 6A-6D are sequential illustrations depicting a method for assembling an aircraft gearbox in accordance with embodiments of the present disclosure.
Figure 6B:
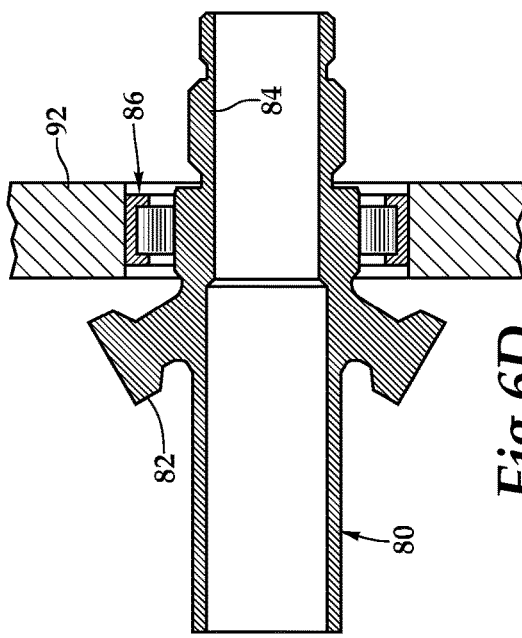

Referring now to FIGS. 6A-6D in the drawings, therein is depicted sequential stages of the assembly of an aircraft gearbox. In FIG. 6A, a gear assembly 80 includes a gear 82 and a cylindrical shaft 84. Gear 82 is depicted as a spiral bevel gear. Cylindrical shaft 84 includes an inner race 86a with a leading shoulder 88 that is sized to be received within outer race 86b and rollers 86c to form roller bearing 86. As used herein, the term "cylindrical" refers to a tubular shaped component that may or may not have an internal or external stepped profile and may or may not include additional non tubular features. In the illustrated embodiment, outer race 86b and rollers 86c have been mounted within an opening 90 of a gearbox housing 92. Due to the tight tolerance between inner race 86a, rollers 86c and outer race 86b as well as the tendency for certain rollers 86c to drop slightly out of position due to gravity, attempting to insert leading shoulder 88 into rollers 86c may result in leading shoulder 88 contacting one or more of rollers 86c the impact of which may damage the affected rollers 86c and/or the leading shoulder. In the present embodiment, however, a cylindrical guide sleeve 94 having a lead-in chamfer 96 is mated with cylindrical shaft 84 such that a trailing shoulder 98 of guide sleeve 94 is positioned proximate leading shoulder 88 of cylindrical shaft 84, as best seen in FIG. 6B. In the illustrated embodiment, this is achieved by inserting a leading end 100 of cylindrical shaft 84 within a trailing end 102 of cylindrical guide sleeve 94.

Lead-in chamfer 96 has a progressively increasing outer diameter from the distal end toward the proximal end with a diameter at the distal end that is sized to enter the rollers 86c without contacting any of rollers 86c even when certain rollers 86c having dropped slightly out of position due to gravity. Lead-in chamfer 96 may have a lead-in chamfer angle of less than twenty degrees such as a lead-in chamfer angle of between five degrees and twenty degrees or a lead-in chamfer angle of between five degrees and ten degrees. The gradual slope of the lead-in chamfer angle further protects rollers 86c as lead-in chamfer 96 will eventually contact one or more rollers 86c. Due to the gradual angle of lead-in chamfer 96, the majority of the force applied to the impacted rollers 86c will be in the radial direction not the axial direction thereby minimizing the potential to cause damage to any of rollers 86c. In addition, to further enhance the protection of rollers 86c, cylindrical guide sleeve 94 may be formed from a material that is softer than that of gear assembly 80 which is preferably formed from a metal such as steel. For example, cylindrical guide sleeve 94 may be formed from a polymeric material such as a thermoplastic including polymers with built in lubricity such as polyoxymethylene or nylon. In other embodiments, cylindrical guide sleeve 94 may be formed from a metal.

Figure 6C:
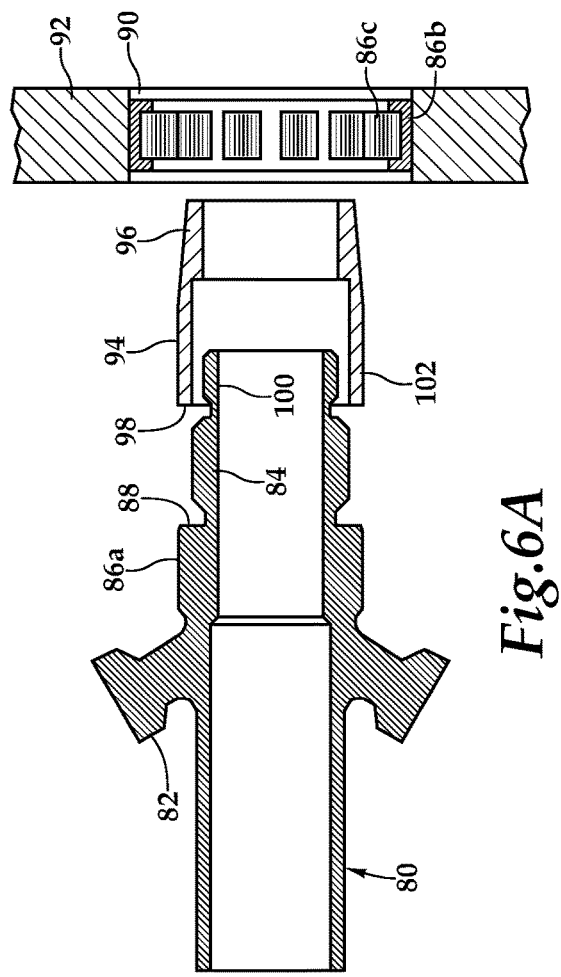
Figure 6D:
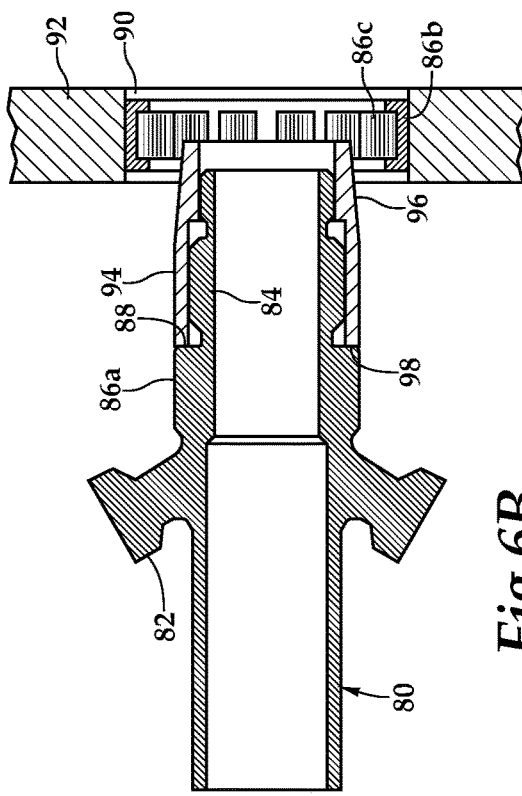

It should be noted that at least a portion of lead-in chamfer 96 may be inserted into rollers 86c before mating cylindrical guide sleeve 94 with gear assembly 80 or cylindrical guide sleeve 94 may be mated with gear assembly 80 before inserting the leading end of lead-in chamfer 94 into rollers 86c. In either case, as cylindrical guide sleeve 94 passing through rollers 86c, lead-in chamfer 96 radially outwardly urging rollers 86c toward outer race 86b as required. With rollers 86c positioned in the proper radial locations within outer race 86b, trailing shoulder 98 of cylindrical guide sleeve 94 and the adjacent leading shoulder 88 of cylindrical shaft 84 are able to axially pass through rollers 86c without impacting the side surfaces of rollers 86c. As gear assembly 80 continues to move axially relative to rollers 86c, either through axial movement of gear assembly 80, axial movement of gearbox housing 92 or both, inner race 86a is positioned relative to rollers 86c to properly form roller bearing 86, as best seen in FIG. 6C. Once installation of gear assembly 80 is complete, cylindrical guide sleeve 94 is removed from gear assembly 80, as best seen in FIG. 6D, as cylindrical guide sleeve 94 is not part of the final assembly of the aircraft gearbox.

Figure 7:
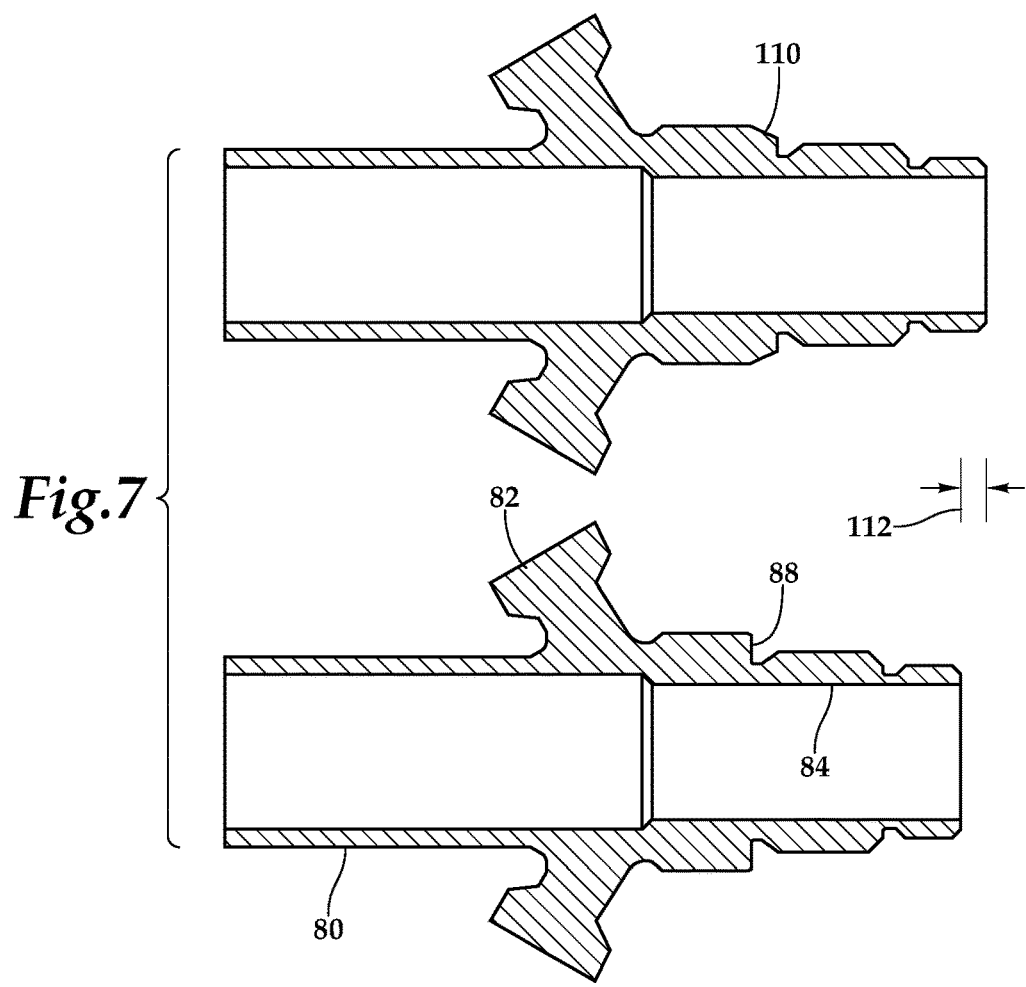
FIG. 7 depicts a comparison between a prior art gear assembly and a gear assembly for use in accordance with embodiments of the present disclosure.

Referring additionally to FIG. 7 of the drawings, gear assembly 80 for use in the present embodiments is located below a prior art gear assembly of the type that would have been installed in an aircraft gearbox without the advantages of cylindrical guide sleeve 94. Instead of having leading shoulder 88 like gear assembly 80, the prior art gear assembly attempted to use an angled leading surface 110 to reduce the risk of damaging the rollers upon installation. It has been found, however, that the slope of the leading surface is critical in preventing impact damage. For example, a slope of twenty degrees is considered to be the maximum allowable lead-in angle suitable for preventing potential damage to the rollers upon installation with a slope of ten degrees being preferable and a slope of five degrees being more preferable. While an angled leading surface 110 could have a slope of twenty degrees, ten degrees or even five degrees, the added length 112 required by such a gear assembly and importantly the weight penalty associated with such added length is not desirable in aircraft gearbox installations.

Figure 8A:
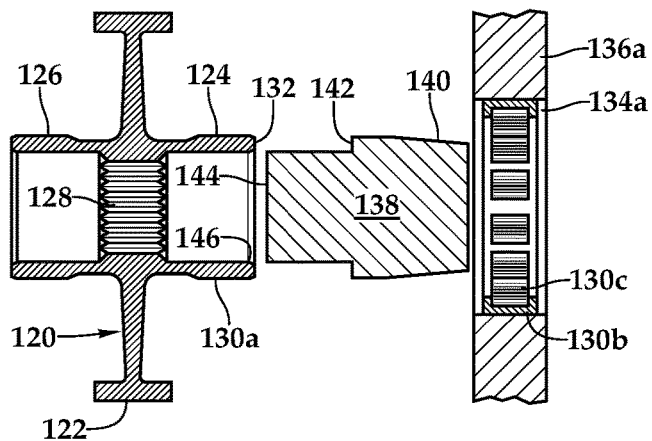
FIGS. 8A-8L are sequential illustrations depicting a method for assembling an aircraft gearbox in accordance with embodiments of the present disclosure.
Figure 8D:
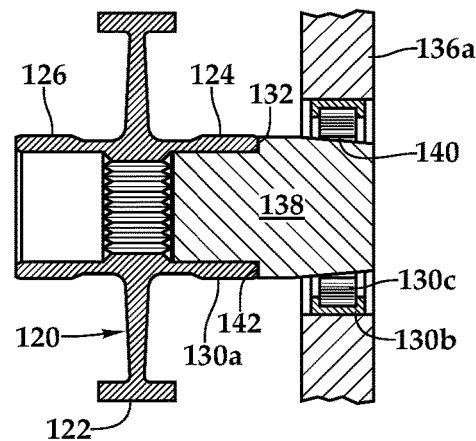
Figure 8B:
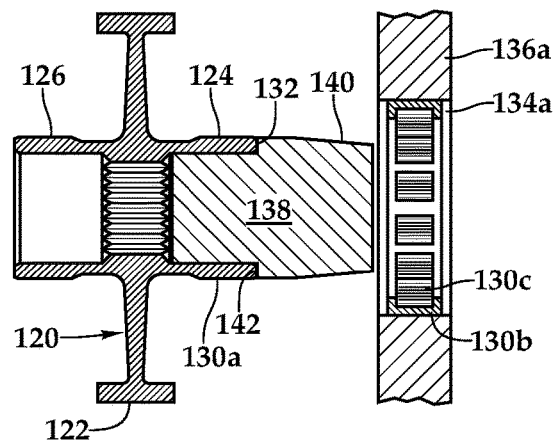

Referring now to FIGS. 8A-8L in the drawings, therein is depicted sequential stages of the assembly of an aircraft gearbox. In FIG. 8A, a gear assembly 120 includes a gear 122, a cylindrical shaft 124 and an oppositely disposed cylindrical shaft 126. Gear 122 is depicted as having an internal spline 128 that is suitable for coupling to an external spline of a drive shaft that may provide input torque to gear assembly 120 or receive output torque from gear assembly 120. Cylindrical shaft 126 includes an inner race 130a with a leading shoulder 132 that is sized to be received within outer race 130b and rollers 130c to form roller bearing 130. In the illustrated embodiment, outer race 130b and rollers 130c have been mounted within an opening 134a of a gearbox housing member 136a. Due to the tight tolerance between inner race 130a, rollers 130c and outer race 130b as well as the tendency for certain rollers 130c to drop slightly out of position due to gravity, attempting to insert leading shoulder 132 into rollers 130c may result in leading shoulder 132 contacting one or more of rollers 130c the impact of which may damage the affected rollers 130c and/or the leading shoulder. In the present embodiment, however, a cylindrical guide sleeve 138 having a lead-in chamfer 140 is mated with cylindrical shaft 124 such that a trailing shoulder 142 of guide sleeve 138 is positioned proximate leading shoulder 132 of cylindrical shaft 124, as best seen in FIG. 8B. In the illustrated embodiment, this is achieved by inserting a trailing end 144 of cylindrical guide sleeve 138 within a leading end 146 of cylindrical shaft 124.

Figure 8E:
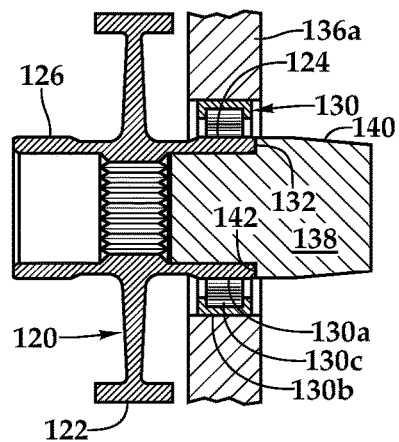
Figure 8C:
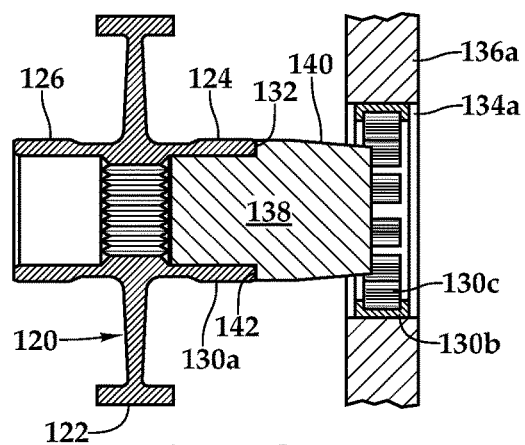

Lead-in chamfer 140 has a progressively increasing outer diameter from the distal end toward the proximal end with a diameter at the distal end that is sized to enter the rollers 130c without contacting any of rollers 130c even when certain rollers 130c having dropped slightly out of position due to gravity, as best seen in FIG. 8C. Lead-in chamfer 140 may have a lead-in chamfer angle of less than twenty degrees such as a lead-in chamfer angle of between five degrees and twenty degrees or a lead-in chamfer angle of between five degrees and ten degrees. The gradual slope of the lead-in chamfer angle further protects rollers 130c as lead-in chamfer 140 will eventually contact one or more rollers 130c, as best seen in FIG. 8D. Due to the gradual angle of lead-in chamfer 140 the majority of the force applied to the impacted rollers 130c will be in the radial direction not the axial direction thereby minimizing the potential to cause damage to any of rollers 130c.

Figure 8F:
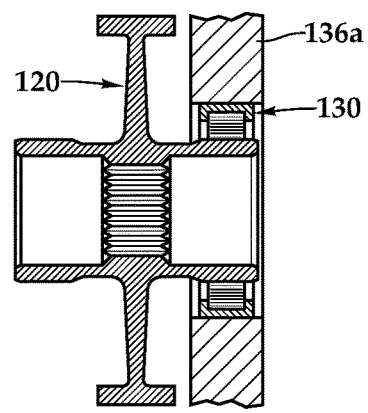

It should be noted that at least a portion of lead-in chamfer 140 may be inserted into rollers 130c before mating cylindrical guide sleeve 138 with gear assembly 120 or cylindrical guide sleeve 138 may be mated with gear assembly 120 before inserting the leading end of lead-in chamfer 140 into rollers 130c. In either case, as cylindrical guide sleeve 138 passing through rollers 130c, lead-in chamfer 140 radially outwardly urging rollers 130c toward outer race 130b as required. With rollers 130c positioned in the proper radial locations within outer race 130b, trailing shoulder 142 of cylindrical guide sleeve 138 and the adjacent leading shoulder 132 of cylindrical shaft 124 are able to axially pass through rollers 130c without impacting the side surfaces of rollers 130c. Gear assembly 120 continues to move axially relative to rollers 130c until inner race 130a is positioned relative to rollers 130c to properly form roller bearing 130, as best seen in FIG. 8E. Once installation of gear assembly 120 is complete, cylindrical guide sleeve 138 is removed from gear assembly 120, as best seen in FIG. 8F, as cylindrical guide sleeve 138 is not part of the final assembly of the aircraft gearbox.

Figure 8G:
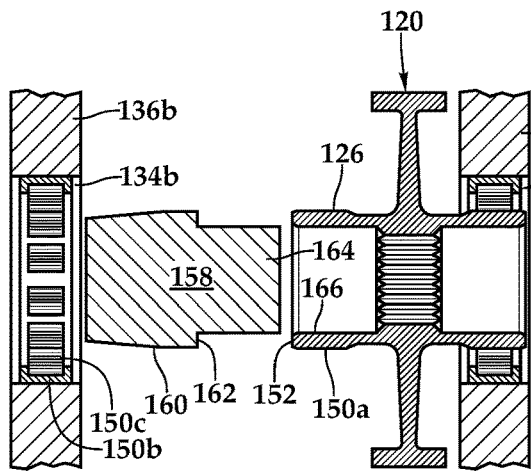
Figure 8J:
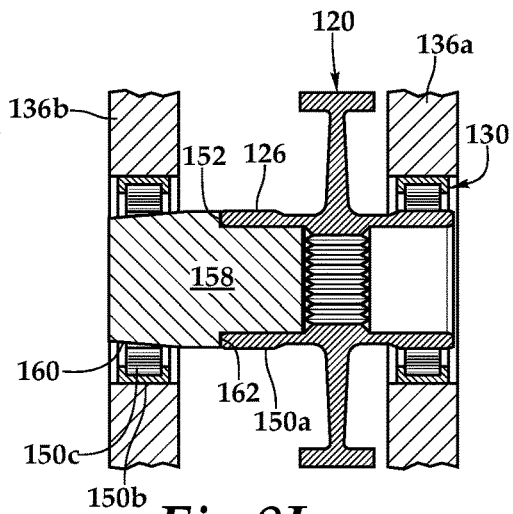
Figure 8H:
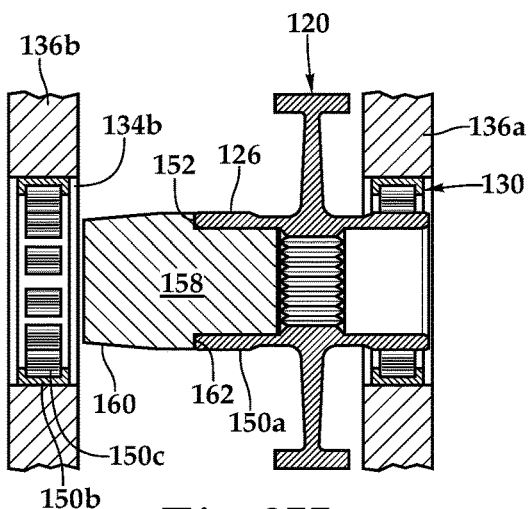

In the illustrated embodiment, the aircraft gearbox housing 136 is formed when gearbox housing member 136a and gearbox housing member 136b are coupled together. Referring to FIG. 8G, this is achieved by installing cylindrical shaft 126 including inner race 150a with a leading shoulder 152 within outer race 150b and rollers 150c to form roller bearing 150. In the illustrated embodiment, outer race 150b and rollers 150c have been mounted within an opening 134b of a gearbox housing member 136b. Due to the tight tolerance between inner race 150a, rollers 150c and outer race 150b as well as the tendency for certain rollers 150c to drop slightly out of position due to gravity, attempting to insert leading shoulder 152 into rollers 150c may result in leading shoulder 152 contacting one or more of rollers 150c the impact of which may damage the affected rollers 150c and/or the leading shoulder. In the present embodiment, however, a cylindrical guide sleeve 158 having a lead-in chamfer 160 is mated with cylindrical shaft 126 such that a trailing shoulder 162 of guide sleeve 158 is positioned proximate leading shoulder 152 of cylindrical shaft 126, as best seen in FIG. 8H. In the illustrated embodiment, this is achieved by inserting a trailing end 164 of cylindrical guide sleeve 158 within a leading end 166 of cylindrical shaft 126.

Figure 8K:
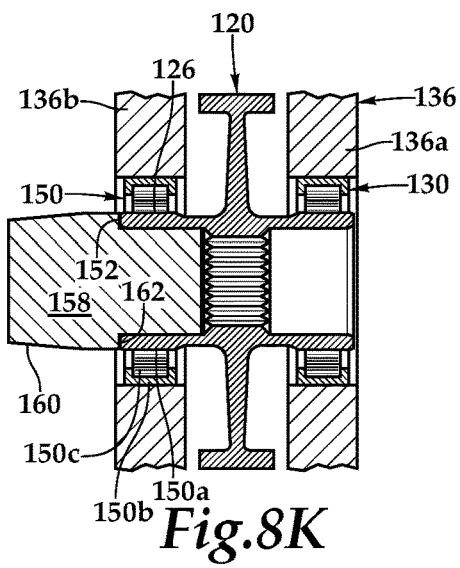
Figure 8I:
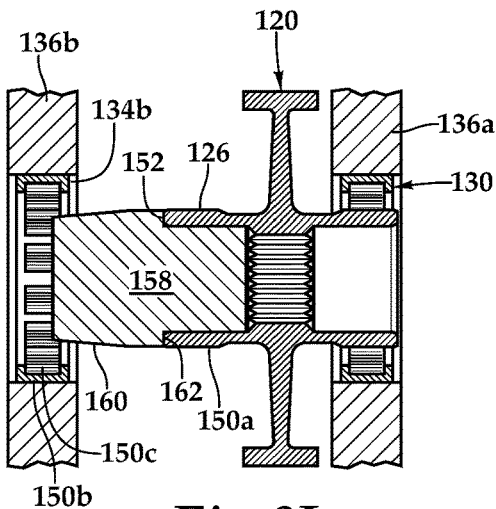

Lead-in chamfer 160 has a progressively increasing outer diameter from the distal end toward the proximal end with a diameter at the distal end that is sized to enter the rollers 150c without contacting any of rollers 150c even when certain rollers 150c having dropped slightly out of position due to gravity, as best seen in FIG. 8I. Lead-in chamfer 160 may have a lead-in chamfer angle of less than twenty degrees such as a lead-in chamfer angle of between five degrees and twenty degrees or a lead-in chamfer angle of between five degrees and ten degrees. The gradual slope of the lead-in chamfer angle further protects rollers 150c as lead-in chamfer 160 will eventually contact one or more rollers 150c, as best seen in FIG. 8J. Due to the gradual angle of lead-in chamfer 160 the majority of the force applied to the impacted rollers 150c will be in the radial direction not the axial direction thereby minimizing the potential to cause damage to any of rollers 150c.

Figure 8L:
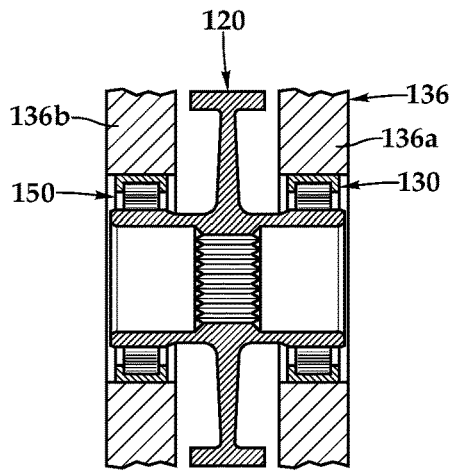

It should be noted that at least a portion of lead-in chamfer 160 may be inserted into rollers 150c before mating cylindrical guide sleeve 158 with gear assembly 120 or cylindrical guide sleeve 158 may be mated with gear assembly 120 before inserting the leading end of lead-in chamfer 160 into rollers 150c. In either case, as cylindrical guide sleeve 158 passing through rollers 150c, lead-in chamfer 160 radially outwardly urging rollers 150c toward outer race 150b as required. With rollers 150c positioned in the proper radial locations within outer race 150b, trailing shoulder 162 of cylindrical guide sleeve 158 and the adjacent leading shoulder 152 of cylindrical shaft 126 are able to axially pass through rollers 150c without impacting the side surfaces of rollers 150c. Gear assembly 120 continues to move axially relative to rollers 150c until inner race 150a is positioned relative to rollers 150c to properly form roller bearing 150, as best seen in FIG. 8K. Once installation of gear assembly 120 is complete, cylindrical guide sleeve 158 is removed from gear assembly 120, as best seen in FIG. 8L, as cylindrical guide sleeve 158 is not part of the final assembly of the aircraft gearbox. It is noted that cylindrical guide sleeve 158 may be the same cylindrical guide sleeve as cylindrical guide sleeve 138 or may be a different cylindrical guide sleeve.

Figure 9:
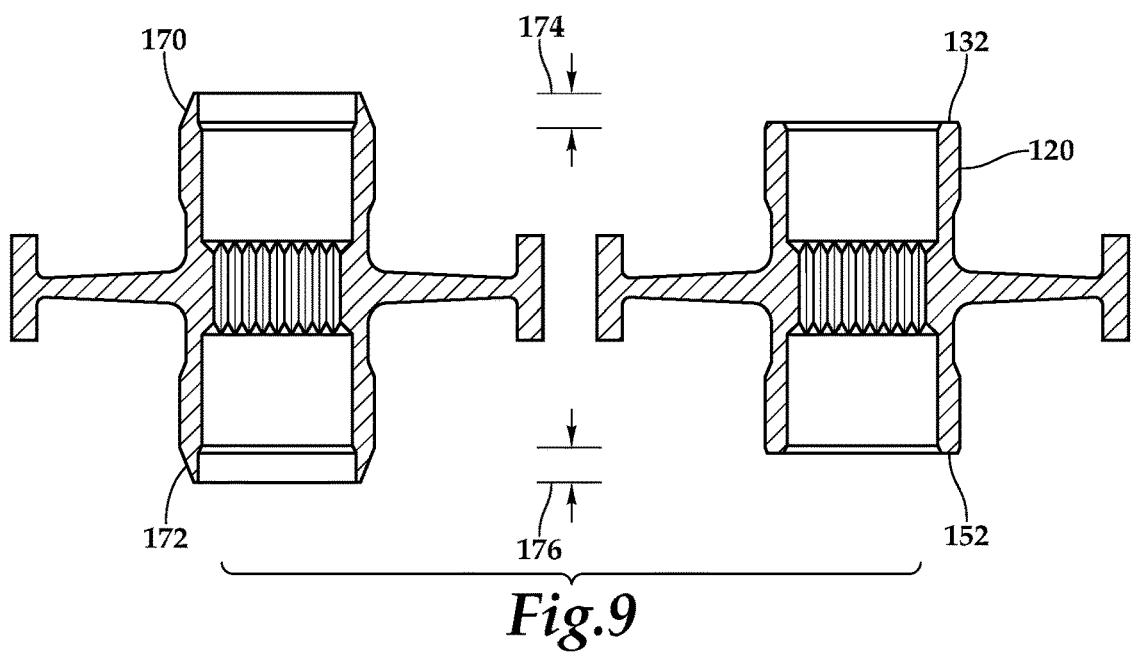
FIG. 9 depicts a comparison between a prior art gear assembly and a gear assembly for use in accordance with embodiments of the present disclosure.

Referring additionally to FIG. 9 of the drawings, gear assembly 120 for use in the present embodiments is located to the right of a prior art gear assembly of the type that would have been installed in an aircraft gearbox without the advantages of cylindrical guide sleeve 138 and cylindrical guide sleeve 158. Instead of having leading shoulders 132, 152 like gear assembly 120, the prior art gear assembly attempted to use angled leading surfaces 170, 172 to reduce the risk of damaging the rollers upon installation. It has been found, however, that the slope of the leading surface is critical in preventing impact damage. For example, a slope of twenty degrees is believed to be the maximum allowable lead-in angle suitable for preventing potential damage to the rollers upon installation with a slope of ten degrees being preferable and a slope of five degrees being more preferable. While angled leading surfaces 170, 172 could have a slope of twenty degrees, ten degrees or even five degrees, the added length 174, 176 required by such a gear assembly and importantly the weight penalty associated with such added length is not desirable in aircraft gearbox installations.

Figure 10A:
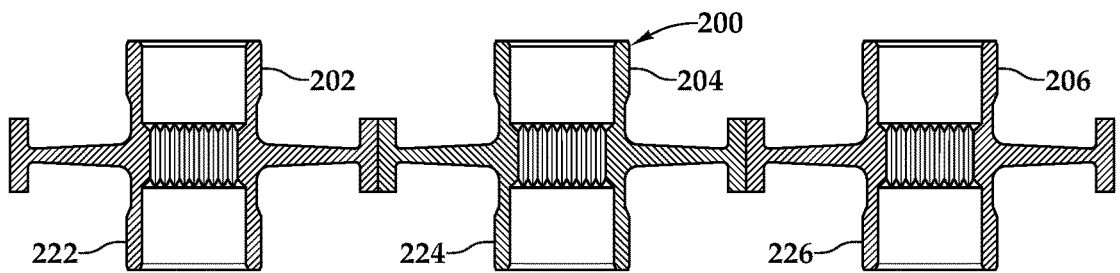
FIGS. 10A-10I are sequential illustrations depicting a method for assembling an aircraft gearbox in accordance with embodiments of the present disclosure.
Figure 10B:
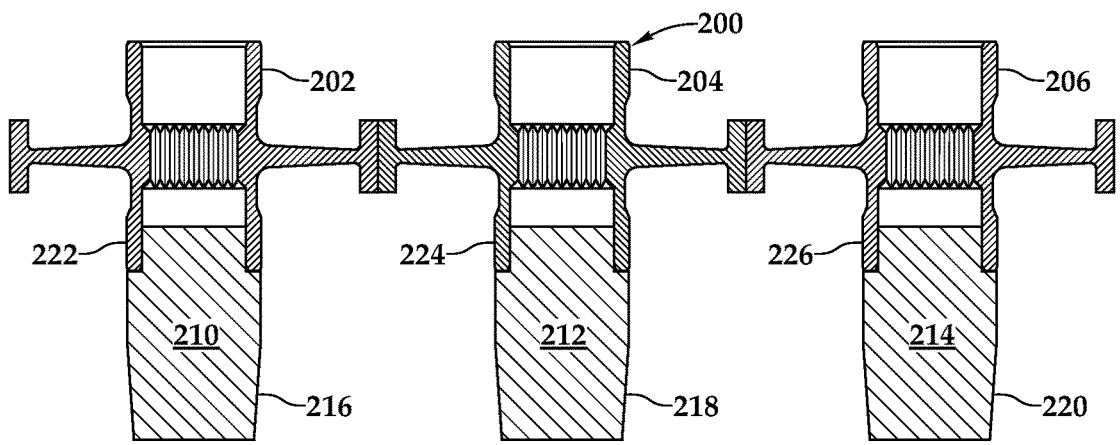

Referring now to FIGS. 10A-10I in the drawings, therein is depicted sequential stages of the assembly of an aircraft gearbox. In FIG. 10A, a gear system 200 has been formed by coupling gear assemblies 202, 204, 206 together such that the gear teeth of gear assembly 204 mesh with the gear teeth of gear assembly 202 and with the gear teeth of gear assembly 206. In the illustrated embodiment, gear system 200 is formed prior to assembling the aircraft gearbox such that gear assemblies 202, 204, 206 may be simultaneously installed in gearbox housing member 208a. For example, in the case of gear assemblies 202, 204, 206 having double-helical gears, it is preferable to form gear system 200 prior to installation. In other embodiments, gear assemblies 202, 204, 206 could be sequentially installed in gearbox housing member 208a. In FIG. 10B, cylindrical guide sleeves 210, 212, 214 having a lead-in chamfers 216, 218, 220 are mated with cylindrical shafts 222, 224, 226 such that a trailing shoulder of each cylindrical guide sleeve 210, 212, 214 is positioned proximate a respective leading shoulder of each cylindrical shaft 222, 224, 226, as best seen in FIG. 10B.

Figure 10C:
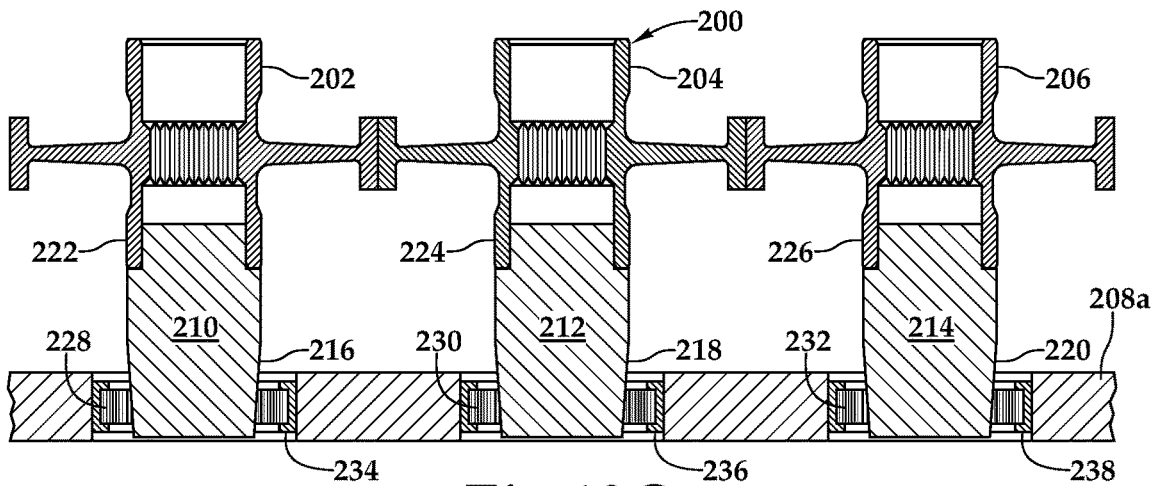
Figure 10D:
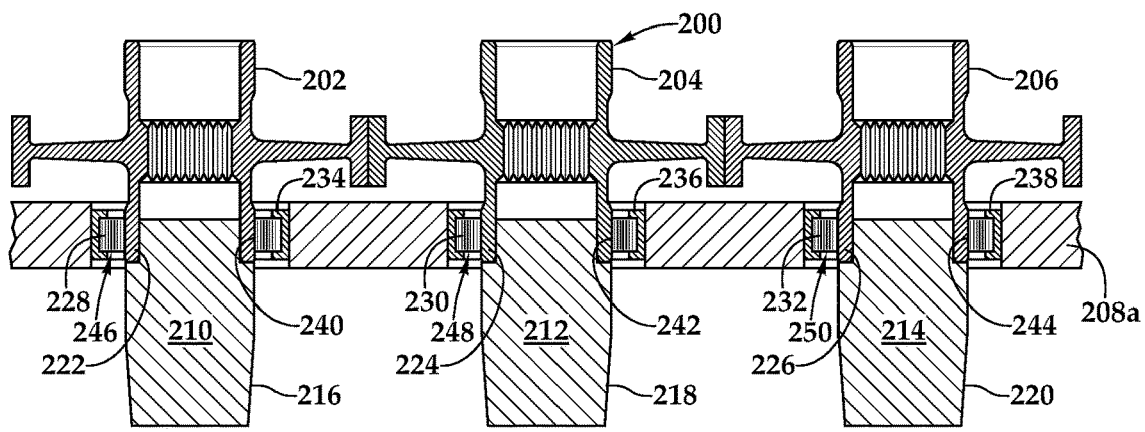
Figure 10E:
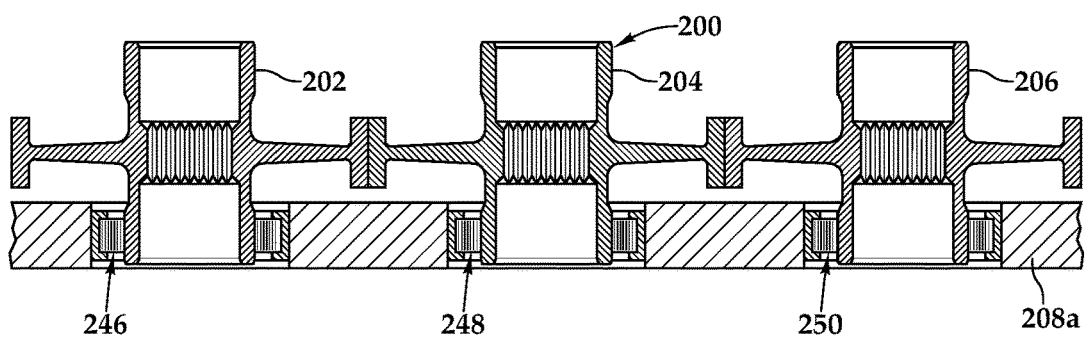

Each lead-in chamfer 216, 218, 220 has a progressively increasing outer diameter from the distal end toward the proximal end with a diameter at the distal end that is sized to enter the respective rollers 228, 230, 232 without contacting the rollers 228, 230, 232 even when certain of rollers 228, 230, 232 having dropped slightly out of position due to gravity, as best seen in FIG. 10C. Lead-in chamfers 216, 218, 220 have suitable lead-in chamfer angles as discussed herein with gradual slopes that protects the rollers as lead-in chamfer 216, 218, 220 will eventually contact some of rollers 228, 230, 232 and radially outwardly urge some of rollers 228, 230, 232 toward respective outer races 234, 236, 238 as cylindrical guide sleeves 210, 212, 214 pass through rollers 228, 230, 232. With rollers 228, 230, 232 positioned in the proper radial locations within the outer races 234, 236, 238, the trailing shoulders of cylindrical guide sleeves 210, 212, 214 and the adjacent leading shoulder of cylindrical shafts 222, 224, 226 are able to axially pass through rollers 228, 230, 232 without impacting the side surfaces of rollers 228, 230, 232. Gear system 200 continues to move axially relative to gearbox housing member 208a, until inner races 240, 242, 244 of cylindrical shafts 222, 224, 226 are positioned relative to rollers 228, 230, 232 to properly form roller bearings 246, 248, 250, as best seen in FIG. 10D. Once installation of gear system 200 is complete, cylindrical guide sleeves 210, 212, 214 are removed from gear assemblies 202, 204, 206, as best seen in FIG. 10E.

Figure 10F:
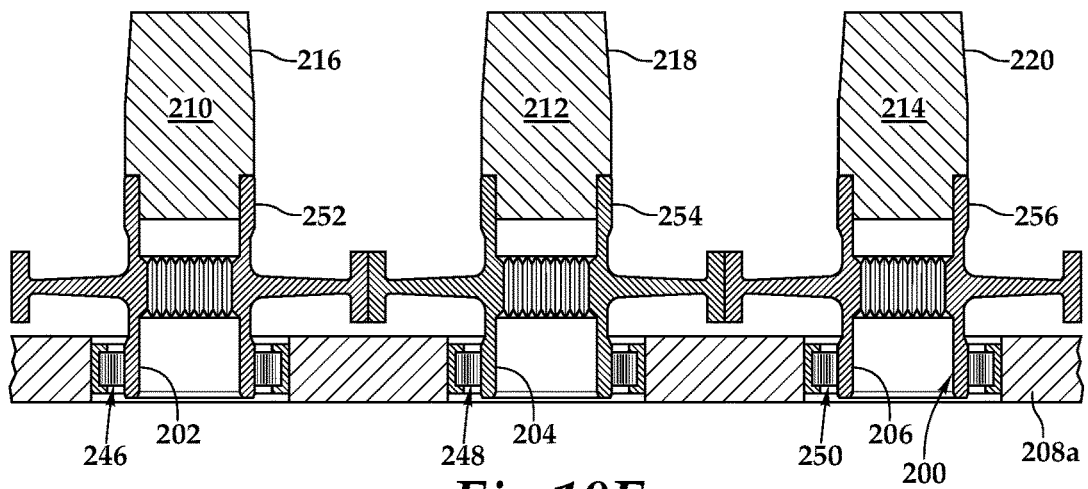
Figure 10G:
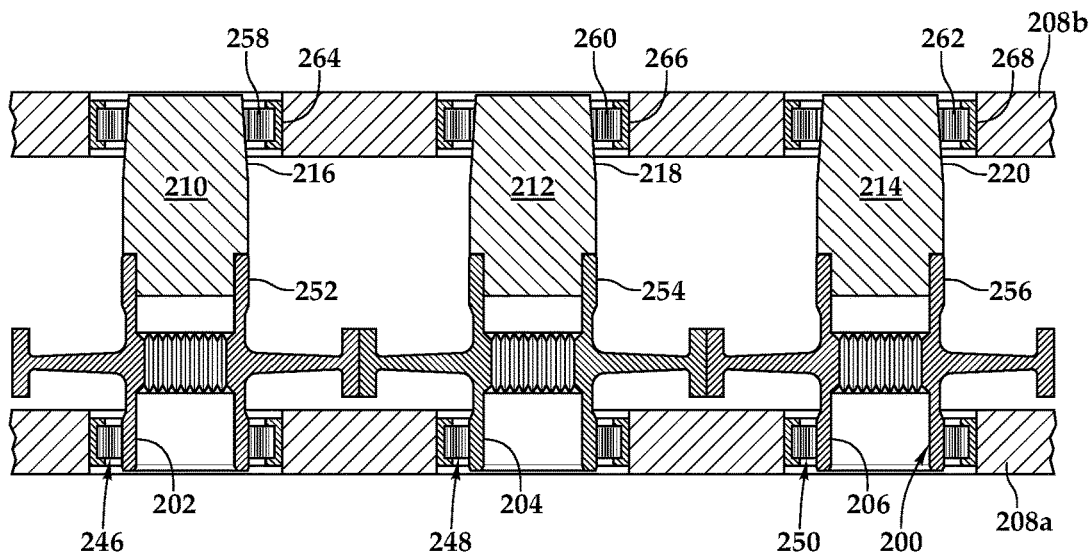
Figure 10H:
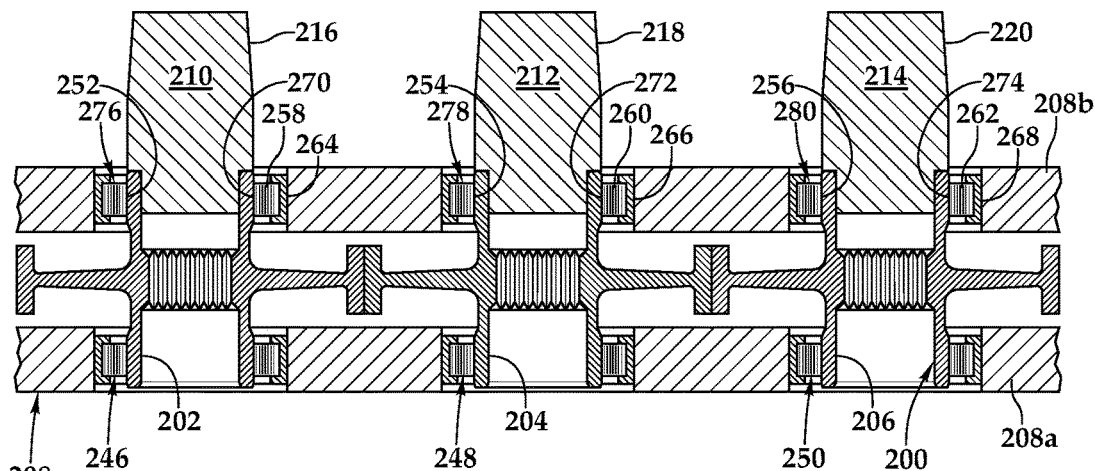
Figure 10I:
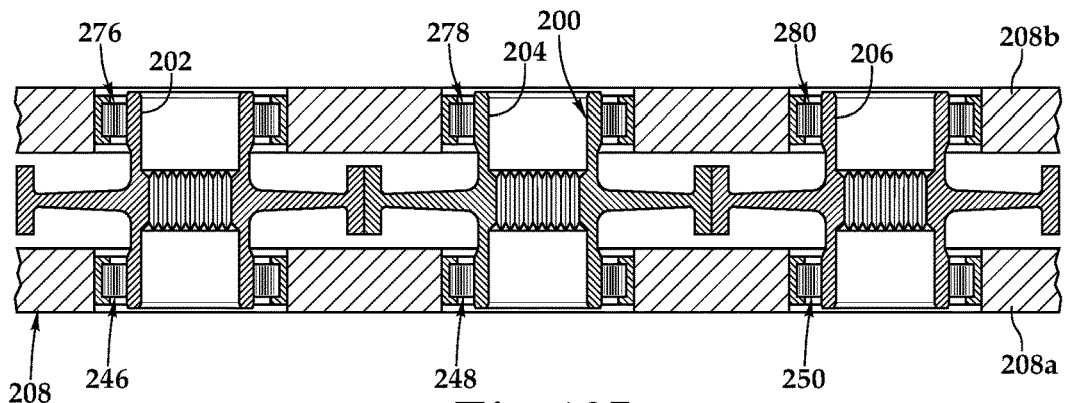

In the illustrated embodiment, the aircraft gearbox housing 208 is formed when gearbox housing member 208a and gearbox housing member 208b are coupled together. In FIG. 10F, cylindrical guide sleeves 210, 212, 214 having a lead-in chamfers 216, 218, 220 are mated with cylindrical shafts 252, 254, 256 such that a trailing shoulder of each cylindrical guide sleeve 210, 212, 214 is positioned proximate a respective leading shoulder of each cylindrical shaft 252, 254, 256. Lead-in chamfers 216, 218, 220 are suitable sized to enter the respective rollers 258, 260, 262 without contacting the rollers 258, 260, 262 even when certain of rollers 258, 260, 262 having dropped slightly out of position due to gravity, as best seen in FIG. 10G. Lead-in chamfers 216, 218, 220 have suitable lead-in chamfer angles as discussed herein with gradual slopes that protects the rollers as lead-in chamfer 216, 218, 220 will eventually contact some of rollers 258, 260, 262 and radially outwardly urge some of rollers 258, 260, 262 toward respective outer races 264, 266, 268 as cylindrical guide sleeves 210, 212, 214 pass through rollers 258, 260, 262. With rollers 258, 260, 262 positioned in the proper radial locations within the outer races 264, 266, 268, the trailing shoulders of cylindrical guide sleeves 210, 212, 214 and the adjacent leading shoulder of cylindrical shafts 252, 254, 256 are able to axially pass through rollers 258, 260, 262 without impacting the side surfaces of rollers 258, 260, 262. Gear system 200 continues to move axially relative to gearbox housing member 208b, until inner races 270, 272, 274 of cylindrical shafts 252, 254, 256 are positioned relative to rollers 258, 260, 262 to properly form roller bearings 276, 278, 280, as best seen in FIG. 10H. Once installation of gear system 200 is complete, cylindrical guide sleeves 210, 212, 214 are removed from gear assemblies 202, 204, 206, as best seen in FIG. 10I. It is noted that the same cylindrical guide sleeves 210, 212, 214 need not be used for installing gear system 200 in both gearbox housing member 208a and gearbox housing member 208b.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A method of assembling an aircraft gearbox, the method comprising:
   mounting a first outer race and a first plurality of rollers of a first roller bearing in a first opening of a gearbox housing and mounting a second outer race and a second plurality of rollers of a second roller bearing in a second opening of the gearbox housing;
   mating a first cylindrical guide sleeve having a first lead-in chamfer with a first gear assembly having a first double-helical gear and a first cylindrical shaft such that a trailing shoulder of the first guide sleeve is positioned proximate a leading shoulder of the first shaft, the first shaft including a first inner race of the first roller bearing;
   mating a second cylindrical guide sleeve having a second lead-in chamfer with a second gear assembly having a second double-helical gear and a second cylindrical shaft such that a trailing shoulder of the second guide sleeve is positioned proximate a leading shoulder of the second shaft, the second shaft including a second inner race of the second roller bearing;
   prior to coupling the first and second gear assemblies with the gearbox housing, forming a double-helical gear system by meshing the first double-helical gear and the second double-helical gear; and
   coupling the double-helical gear system to the gearbox housing by:
   radially outwardly urging the rollers of the first plurality of rollers toward the first outer race by coaxially passing the first lead-in chamfer through the first plurality of rollers and radially outwardly urging the rollers of the second plurality of rollers toward the second outer race by coaxially passing the second lead-in chamfer through the second plurality of rollers;
   axially passing the leading shoulder of the first shaft through the first plurality of rollers after the rollers of the first plurality of rollers have been radially outwardly urged toward the first outer race by the first guide sleeve and axially passing the leading shoulder of the second shaft through the second plurality of rollers after the rollers of the second plurality of rollers have been radially outwardly urged toward the second outer race by the second guide sleeve;
   positioning the first inner race relative to the first plurality of rollers to form the first roller bearing and positioning the second inner race relative to the second plurality of rollers to form the second roller bearing; and
   removing the first and second guide sleeves from the first and second gear assemblies.

2. The method as recited in claim 1 wherein the first cylindrical guide sleeve has a lead-in chamfer angle of less than twenty degrees and wherein the second cylindrical guide sleeve has a lead-in chamfer angle of less than twenty degrees.

3. The method as recited in claim 1 wherein the first cylindrical guide sleeve has a lead-in chamfer angle of between five degrees and twenty degrees and wherein the second cylindrical guide sleeve has a lead-in chamfer angle of between five degrees and twenty degrees.

4. The method as recited in claim 1 wherein the first cylindrical guide sleeve has a lead-in chamfer angle of between five degrees and ten degrees and wherein the second cylindrical guide sleeve has a lead-in chamfer angle of between five degrees and ten degrees.

5. The method as recited in claim 1 wherein radially outwardly urging the rollers of the first and second plurality of rollers toward the first and second outer races occurs simultaneously.

6. The method as recited in claim 1 wherein axially passing the leading shoulders of the first and second shafts through the first and second plurality of rollers occurs simultaneously.

7. The method as recited in claim 1 wherein positioning the first and second inner races relative to the first and second plurality of rollers to form the first and second roller bearings occurs simultaneously.

8. The method as recited in claim 1 wherein the first and second cylindrical guide sleeves are polymeric guide sleeves; and
   wherein, the first and second gear assemblies are metallic gear assemblies.

9. A method of assembling an aircraft gearbox, the method comprising:
   mounting a first outer race and a first plurality of rollers of a first roller bearing in a first opening of a gearbox housing and mounting a second outer race and a second plurality of rollers of a second roller bearing in a second opening of the gearbox housing;
   mating a first cylindrical guide sleeve having a first lead-in chamfer with a first gear assembly having a first double-helical gear and a first cylindrical shaft such that a trailing shoulder of the first guide sleeve is positioned proximate a leading shoulder of the first shaft, the first shaft including a first inner race of the first roller bearing;

mating a second cylindrical guide sleeve having a second lead-in chamfer with a second gear assembly having a second double-helical gear and a second cylindrical shaft such that a trailing shoulder of the second guide sleeve is positioned proximate a leading shoulder of the second shaft, the second shaft including a second inner race of the second roller bearing;

prior to coupling the first and second gear assemblies with the gearbox housing, forming a double-helical gear system by meshing the first double-helical gear and the second double-helical gear; and coupling the double-helical gear system to the gearbox housing by:

simultaneously radially outwardly urging the rollers of the first plurality of rollers toward the first outer race by coaxially passing the first lead-in chamfer through the first plurality of rollers and radially outwardly urging the rollers of the second plurality of rollers toward the second outer race by coaxially passing the second lead-in chamfer through the second plurality of rollers;

simultaneously axially passing the leading shoulder of the first shaft through the first plurality of rollers after the rollers of the first plurality of rollers have been radially outwardly urged toward the first outer race by the first guide sleeve and axially passing the leading shoulder of the second shaft through the second plurality of rollers after the rollers of the second plurality of rollers have been radially outwardly urged toward the second outer race by the second guide sleeve;

simultaneously positioning the first inner race relative to the first plurality of rollers to form the first roller bearing and positioning the second inner race relative to the second plurality of rollers to form the second roller bearing; and removing the first and second guide sleeves from the first and second gear assemblies.

10. The method as recited in claim 9 wherein the first cylindrical guide sleeve has a lead-in chamfer angle of less than twenty degrees and wherein the second cylindrical guide sleeve has a lead-in chamfer angle of less than twenty degrees.

11. The method as recited in claim 9 wherein the first cylindrical guide sleeve has a lead-in chamfer angle of between five degrees and twenty degrees and wherein the second cylindrical guide sleeve has a lead-in chamfer angle of between five degrees and twenty degrees.

12. The method as recited in claim 9 wherein the first cylindrical guide sleeve has a lead-in chamfer angle of between five degrees and ten degrees and wherein the second cylindrical guide sleeve has a lead-in chamfer angle of between five degrees and ten degrees.

13. The method as recited in claim 9 wherein the first and second cylindrical guide sleeves are polymeric guide sleeves; and wherein, the first and second gear assemblies are metallic gear assemblies.

14. A method of assembling an aircraft gearbox, the method comprising:

mounting a first outer race and a first plurality of rollers of a first roller bearing in a first opening of a gearbox housing, mounting a second outer race and a second plurality of rollers of a second roller bearing in a second opening of the gearbox housing and mounting a third outer race and a third plurality of rollers of a third roller bearing in a third opening of the gearbox housing;

mating a first cylindrical guide sleeve having a first lead-in chamfer with a first gear assembly having a first double-helical gear and a first cylindrical shaft such that a trailing shoulder of the first guide sleeve is positioned proximate a leading shoulder of the first shaft, the first shaft including a first inner race of the first roller bearing;

mating a second cylindrical guide sleeve having a second lead-in chamfer with a second gear assembly having a second double-helical gear and a second cylindrical shaft such that a trailing shoulder of the second guide sleeve is positioned proximate a leading shoulder of the second shaft, the second shaft including a second inner race of the second roller bearing;

mating a third cylindrical guide sleeve having a third lead-in chamfer with a third gear assembly having a third double-helical gear and a third cylindrical shaft such that a trailing shoulder of the third guide sleeve is positioned proximate a leading shoulder of the third shaft, the third shaft including a third inner race of the third roller bearing;

prior to coupling the first, second and third gear assemblies with the gearbox housing, forming a double-helical gear system by meshing the first double-helical gear with each of the second and third double-helical gears; and coupling the double-helical gear system to the gearbox housing by:

radially outwardly urging the rollers of the first plurality of rollers toward the first outer race by axially passing the first lead-in chamfer through the first plurality of rollers, radially outwardly urging the rollers of the second plurality of rollers toward the second outer race by axially passing the second lead-in chamfer through the second plurality of rollers and radially outwardly urging the rollers of the third plurality of rollers toward the third outer race by axially passing the third lead-in chamfer through the third plurality of rollers;

axially passing the leading shoulder of the first shaft through the first plurality of rollers after the rollers of the first plurality of rollers have been radially outwardly urged toward the first outer race by the first guide sleeve, axially passing the leading shoulder of the second shaft through the second plurality of rollers after the rollers of the second plurality of rollers have been radially outwardly urged toward the second outer race by the second guide sleeve and axially passing the leading shoulder of the third shaft through the third plurality of rollers after the rollers of the third plurality of rollers have been radially outwardly urged toward the third outer race by the third guide sleeve;

positioning the first inner race relative to the first plurality of rollers to form the first roller bearing, positioning the second inner race relative to the second plurality of rollers to form the second roller bearing and positioning the third inner race relative to the third plurality of rollers to form the third roller bearing; and removing the first, second and third guide sleeves from the first, second and third gear assemblies.

15. The method as recited in claim 14 wherein each of the cylindrical guide sleeves has a lead-in chamfer angle of less than twenty degrees.

16. The method as recited in claim 14 wherein each of the cylindrical guide sleeves has a lead-in chamfer angle of between five degrees and twenty degrees.

17. The method as recited in claim 14 wherein each of the cylindrical guide sleeves has a lead-in chamfer angle of between five degrees and ten degrees.

18. The method as recited in claim 14 wherein radially outwardly urging the rollers of the first, second and third plurality of rollers toward the first, second and third outer races occurs simultaneously.

19. The method as recited in claim 14 wherein axially passing the leading shoulders of the first, second and third shafts through the first, second and third plurality of rollers occurs simultaneously.

20. The method as recited in claim 14 wherein positioning the first, second and third inner races relative to the first, second and third plurality of rollers to form the first, second and third roller bearings occurs simultaneously.

\* \* \* \* \*